Figure 1:
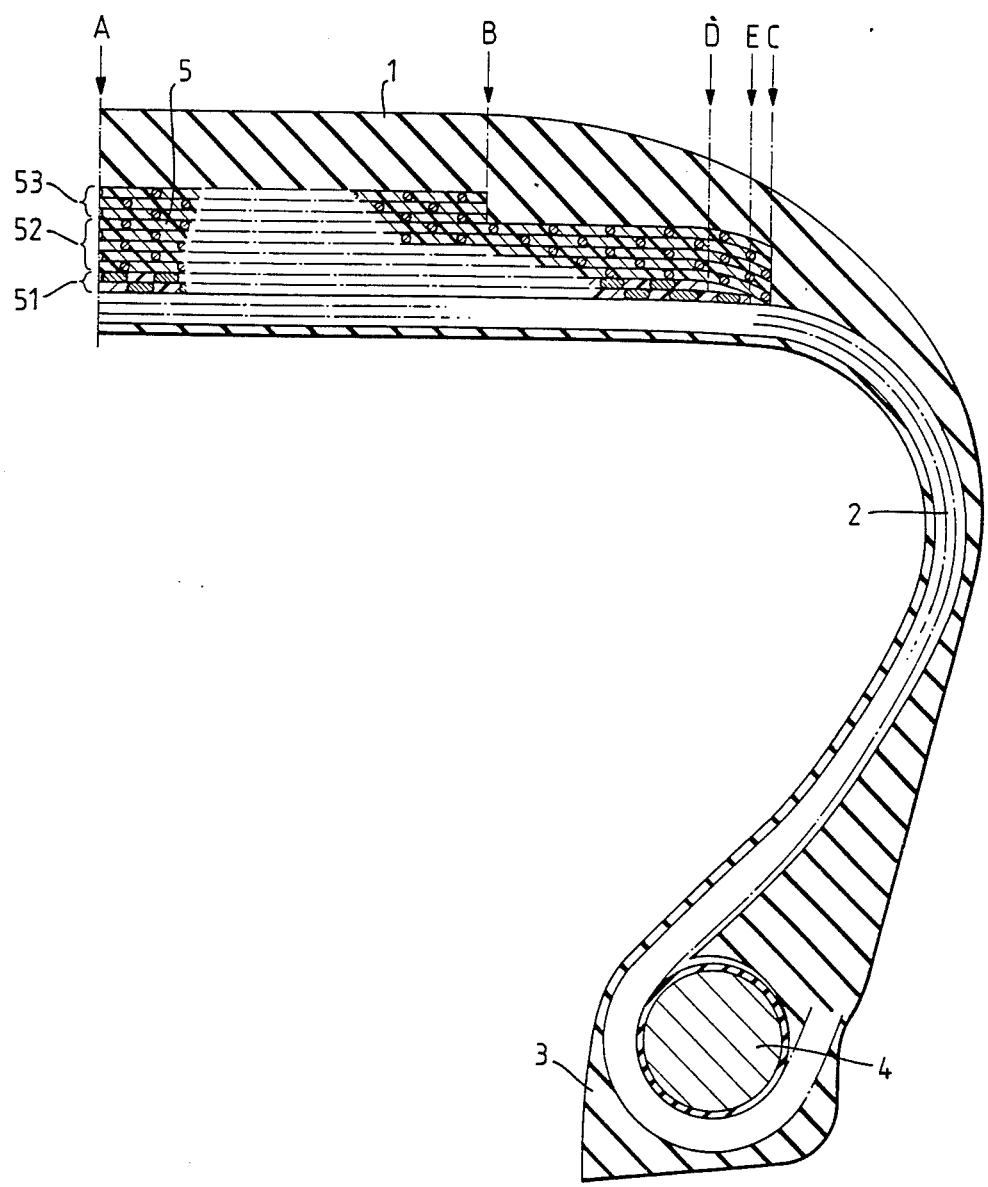

United States Patent [19]

Panikkar et al.

[11] Patent Number: 4,947,915

[45] Date of Patent: Aug. 14, 1990

[54] RADIAL PLY TIRE

[75] Inventors: Tharamel P. K. Panikkar, Sutton Coldfield; Stephen Barlow, Stoke on Trent, both of England

[73] Assignee: Dunlop Limited, United Kingdom

[21] Appl. No.: 269,540

[22] PCT Filed: Mar. 7, 1988

[86] PCT No.: PCT/GB88/00171
§ 371 Date: Dec. 7, 1988
§ 102(e) Date: Dec. 7, 1988

[87] PCT Pub. No.: WO88/06981
PCT Pub. Date: Sep. 22, 1988

[30] Foreign Application Priority Data

Mar. 12, 1987 [GB] United Kingdom ................. 8705926

[51] Int. Cl.$^5$ ............................ B60C 9/22; B60C 9/28
[52] U.S. Cl. .................................... 152/531; 152/534; 152/538; 152/560
[58] Field of Search ............... 152/526, 531, 534, 538, 152/557, 560, 536

[56] References Cited

U.S. PATENT DOCUMENTS

| 3,831,656 | 8/1974 | Senger et al. ............... 152/531 X |
| 4,454,903 | 5/1983 | Noel et al. ..................... 152/531 |
| 4,732,199 | 3/1988 | Kajiwara ..................... 152/531 X |

FOREIGN PATENT DOCUMENTS

| 3324522 | 1/1985 | Fed. Rep. of Germany . |
| 2132574 | 12/1983 | United Kingdom . |
| 2171067 | 2/1986 | United Kingdom . |

Primary Examiner—Ramon Hoch
Attorney, Agent, or Firm—Stevens, Davis, Miller & Mosher

[57] ABSTRACT

A high speed radial ply tire, such as an aircraft tire, having a tread reinforcement comprising three groups of layers. The first, radially inner, group comprises two bias ply layers; the second group, wider than the first, being substantially parallel to the tire mid-circumferential plane and the third, radially outer group, narrower than the first, also being substantially parallel to the mid-circumferential plane of the tire. A fourth group of bias cut layers may be positioned between the second and third groups.

14 Claims, 2 Drawing Sheets

RADIAL PLY TIRE

This invention relates to a radial ply pneumatic tire(s). More particularly it relates to a radial ply tire intended to bear heavy loads under high inflation pressure, e.g. as used on aircraft.

In the present specification by "radial-ply tire" is meant one having a carcass comprising one or more plies of parallel cords which cross the mid-circumferential plane of the tire at an angle in the range of 70 degrees–90 degrees. If the angle is not 90 degrees the plies are so arranged that the cords in one ply cross the mid-circumferential plane at the opposite bias to the cords in the adjacent ply.

A radial-ply tire for use on aircraft has to meet stringent requirements. The tire has to be provided with a tread reinforcement which, acting with the carcass and the beads, meets the load-bearing requirements for the given overall weight, size and aspect ratio dependent on the actual type of aircraft for which the tire is intended to be fitted. The tire also has to have adequate high speed performance; for example, the tire operating temperature must not be excessively high, otherwise internal damage may occur. The onset of standing waves which are often initiated in the tire shoulder region must be prevented. The tread reinforcement must be constructed to cause the generation of a cornering force necessary to give the tire adequate cornering stability and also be such as to prevent the excessive increase in the diameter of the center of the tread of the tire due to high inflation pressure and centrifugal forces which could otherwise lead to rapid and uneven tread wear.

It is an object of the present invention to provide a tire having a construction which meets the above-mentioned operating requirements as far as possible.

Thus in accordance with the invention a pneumatic radial ply tire comprises a tread, a radial ply carcass anchored to at least one bead core in each bead region of the tire and a tread reinforcement comprising three groups of layers of cord reinforcing fabric; the first, radially inner, group comprising at least two layers of parallel cords extending at a bias angle lying in the range 15 degrees to 60 degrees, each layer being at opposite bias to the adjacent layer and the width of the first group of layers being less than the contact width of the tire tread under the scheduled load and inflation pressure of the tire; a second group of layers, positioned radially outwards of the first group, and comprising at least two layers of parallel cords extending substantially parallel to the mid-circumference of the tire, and the width of the second group of layers being greater than the width of the first group of layers; and a third group of layers, positioned radially outwards of the second group, comprising at least two layers of parallel cords extending substantially parallel to the mid circumferential plane of the tire and having a width which is substantially less than the width of the second group of layers.

Preferably the carcass comprises more than one ply the bias angle of each being less than 90 degrees and typically lying in the range 75 degrees to 85 degrees. A preferred value is 84 degrees but this depends on the speed requirement and aspect ratio of the tire.

Preferably the bias angle of the cords of the layers in the first group is 45 degrees. Preferably also the width of the first group is between 70% and 90% of the tread contact width under the scheduled load and inflation pressure. The first group of layers in the tread reinforcement serves to generate the cornering force and cornering stability necessary for optimum tire performance.

Preferably the width of the second group of layers is at least 1.03 times that of the first group of layers. Preferably also, the width of the second group is no greater than 1.20 times the tread contact width under the scheduled load and inflation pressure. The second group of layers is intended to enhance the speed performance of the tire by reducing the onset of standing waves being initiated from the tire shoulder regions particularly at the higher speed range of operation of the tire.

Preferably the third group of layers has a width within the range 40% to 70% of the width of the second group. The third group restricts the excessive stretch of the crown portion of the reinforcement ensuing from the high inflation pressure and centrifugal forces at high speeds, thus helping prevent rapid and uneven tread wear in the center region of the tire tread.

A fourth group of layers may also be provided, comprising at least two layers of parallel cords crossing the mid-circumferential plane of the tire at an angle in the range 15 degrees to 60 degrees, each layer being at opposite bias to the adjacent layer in the group, and positioned between the second and third groups of layers.

Preferably the width of this fourth group of layers is not greater than the width of the third group.

A group of layers may comprise separate rubberized fabric plies each wrapped once around the carcass circumference but may also comprise one ply or a small number of plies wrapped more than once around the carcass circumference.

The cords of the carcass ply, and of the second and third group of layers may be either aromatic polyamide, aliphatic polyamide or a mixture of aromatic and aliphatic polyamide fibers. The cords of the first group of layers, and fourth group, if present, may be either steel, aliphatic polyamide, aromatic polyamide or a mixture of aromatic and aliphatic polyamide fibers.

Figure 2:
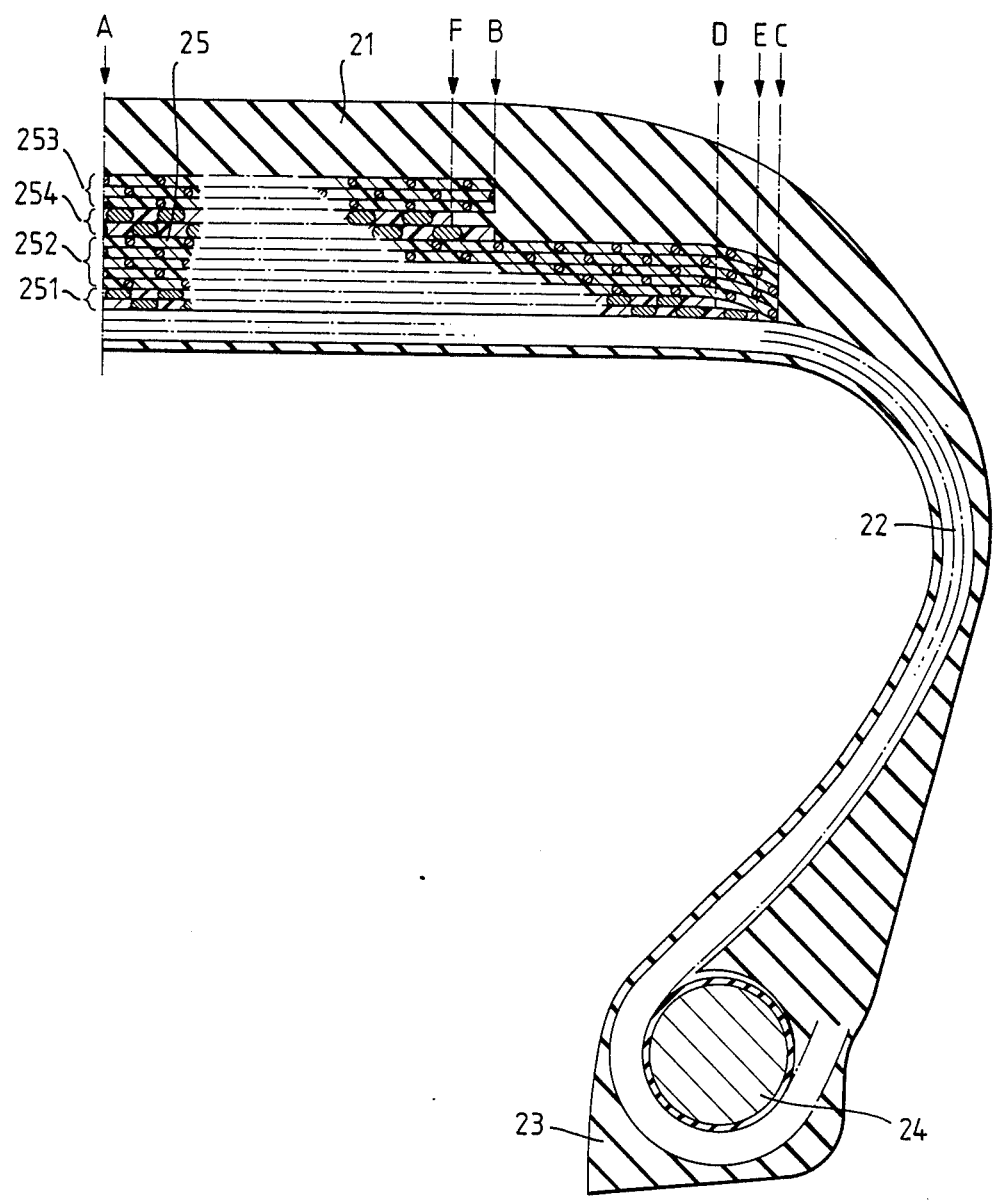

Two embodiments of the invention will now be described in more detail by way of example only, reference being made to the accompanying drawings of which:

FIG. 1 shows half of a cross-section through an aircraft tire according to the first embodiment, and FIG. 2 shows half of a cross-section through an aircraft tire according to the second embodiment.

The aircraft tire illustrated in FIG. 1 is of size 30×11.5R14.5, has an aspect ratio of 67%, and comprises a tread 1, a radial carcass reinforcement 2 anchored in each tire bead region 3 around a bead core 4, and a tread reinforcement 5 lying radially outwards of and encircling the carcass reinforcement 2. In the Figures line A indicates the mid-circumferential plane of the tire.

The carcass reinforcement 2 comprises three plies of aliphatic polyamide cords of 4/188 tex laid at 78 ends per decimeter. The cords in each ply lie parallel to each other and have a finished bias angle of 84 degrees. The bias angle of one ply is opposite to the bias angle of the adjacent ply.

The tread reinforcement 5 comprises three groups of plies 51, 52 and 53. The first group 51 lies radially inwards of the other two groups 52 and 53, and comprises two plies of aliphatic polyamide cords of 4/188 tex laid at 78 e.p.d. The bias angle of the plies is 45 degrees, and the bias angle of one ply is opposite to that of the other ply so the cords in one ply cross the cords in the other ply at 90 degrees. The width of the radially inner ply is 220 mm (Twice AE in FIG. 1) and the width of the radially outer ply is 206 mm (Twice AD). The tread contact width of the tire under a scheduled load of 11,350 kg. (25000 lb) and inflation pressure of 18.61 bar (270 lb/in$^2$) is 247 mm. Thus the inner ply width is 89% of the tread contact width and the outer ply width is 83.4% of the tread contact width under these conditions. Under a greater scheduled load of 14605 kg (32170 lb) and greater inflation pressure of 25.16 bar (365 lb/in$^2$) the tread contact width increases to 248 mm. Thus the inner ply width is 88.7% of the tread contact width and the outer ply width is 83.1% of the tread contact width under this greater load and pressure condition.

The second group 52 is positioned radially outwards of the first group and comprises five separate plies each comprising parallel cords lying substantially parallel i.e. within a tolerance of ±3 degrees, to the mid-circumference of the tire. The cords are the same as the cords of the first group. The plies are all of the same width, i.e. 228 mm. (Twice AC) and this is 1.036 times the width of the wider ply in the first group and 91.5% of the tread contact width of the tire under its scheduled load of 11.350 kg (25000 lb) and inflation pressure of 18.61 bar (270 lb/in$^2$).

The third group lies radially outwards of the second group and comprises three separate plies of parallel cords lying substantially parallel i.e. within a tolerance of ±3 degrees, to the mid-circumference of the tire. The cords are the same as the cords in the first and second groups of plies. The width of the three plies in the third group is 130 mm. (Twice AB) i.e. 58% of the width of the second group.

The second embodiment of the invention, a radial aircraft tire having half of its tread reinforcement illustrated in FIG. 2 comprises a tread 21, carcass reinforcement 22 and bead regions 23 containing bead cores 24 which are all the same as the tire illustrated in FIG. 1. The tread reinforcement 25 of the tire shown in FIG. 2 is similar to the tread reinforcement of the tire shown in FIG. 1 but comprising, in addition to the three groups of plies 251, 252 and 253, which correspond respectively to groups 51, 52 and 53, having the same structure and arrangement, a fourth group of plies 254, positioned between the second and third groups.

The fourth group comprises two separate plies each having a bias angle of 45 degrees, the cords in one ply crossing the cords in the other ply at an angle of 90 degrees. The cords are the same as the cords in the other plies in the tread reinforcement. The width of the radially inner ply is 130 mm. (i.e. equal to the width of the third group) and the width of the radially inner ply is 124 mm. (Twice AF in FIG. 2).

We claim:

1. A radial aircraft tire comprising a tread, a radial ply carcass anchored to at least one bead core in each bead region of the tire and a tread reinforcement comprising three groups of layers of cord reinforcing fabric; the first, radially inner, group comprising at least two layers of parallel cords extending at a bias angle lying in the range 15 degrees to 60 degrees relative to the mid-circumferential plane of the tire, each layer being at opposite bias to the adjacent layer, and the width of the first group of layers being less than the contact width of the tire tread under the scheduled load and inflation pressure of the tire; a second group of layers, positioned radially outwards of the first group, and comprising at least two layers of parallel cords extending substantially parallel to the mid-circumferential plane of the tire, and the width of the second group of layers being greater than the width of the first group of layers; and a third group of layers, positioned radially outwards of the second group, comprising at least two layers of parallel cords extending substantially parallel to the mid-circumferential plane of the tire and having a width lying within the range of 40% to 70% of the width of the second group of layers.

2. A radial aircraft tire according to claim 1 in which the carcass comprises more than one ply having a bias angle in the range 75 degrees–85 degrees.

3. A radial aircraft tire according to claim 1 in which the bias angle of the carcass ply is 84 degrees and the aspect ratio of the tire is 67%.

4. A radial aircraft tire according to claim 1 in which the bias angle of the cords in the layers in the first group is 45 degrees.

5. A radial aircraft tire according to claim 1 in which the width of the first group is between 70% and 90% of the tread contact width of the tire under the scheduled load and inflation pressure.

6. A radial aircraft tire according to claim 1 in which the width of the second group is at least 1.03 times that of the first group.

7. A radial aircraft tire according to claim 1 in which the width of the second group is no greater than 1.20 times the tread contact width under the scheduled load and inflation pressure.

8. A radial aircraft tire according to claim 1 including a fourth group of plies comprising at least two layers of parallel cords crossing the mid-circumferential plane of the tire at an angle in the range 15 degrees to 60 degrees, each layer being at opposite bias to the adjacent layer in the group, and positioned between the second and third group of layers.

9. A radial aircraft tire according to claim 8 in which said angle of the fourth group of plies is about 45 degrees.

10. A radial aircraft tire according to claim 8 in which the width of the fourth group of layers is no greater than the width of the third group.

11. A radial aircraft tire according to claim 1 in which a group of layers comprises separate rubberized fabric plies each wrapped once around the carcass circumference.

12. A radial aircraft tire according to claim 1 in which a group of layers comprises one ply, or a small number of plies, wrapped more than once around the carcass circumference.

13. A radial aircraft tire according to claim 1 in which the cords of any one of the first, second and third group of layers comprises fibers chosen from the group consisting of aromatic polyamide, aliphatic polyamide and a mixture of aromatic and aliphatic polyamide fibers.

14. A radial aircraft tire according to claim 8 in which the cords of the fourth group of layers comprise fibers chosen from the group consisting of aromatic polyamide, aliphatic polyamide and a mixture of aromatic and aliphatic polyamide fibers.

* * * * *